(12) United States Patent
Aharonian et al.

(10) Patent No.: US 7,366,933 B1
(45) Date of Patent: Apr. 29, 2008

(54) POWER EVENT ANALYSIS

(75) Inventors: David M. Aharonian, Warwick, RI (US); Matthew D. Sojka, Wakefield, RI (US); Edward M. Ives, Exeter, RI (US)

(73) Assignee: American Power Conversion Corporation, West Kingston, RI (US)

( * ) Notice: Subject to any disclaimer, the term of this patent is extended or adjusted under 35 U.S.C. 154(b) by 387 days.

(21) Appl. No.: 10/887,714

(22) Filed: Jul. 9, 2004

(51) Int. Cl.
*G06F 11/30* (2006.01)
(52) U.S. Cl. ..................... 713/340; 715/700
(58) Field of Classification Search ............... 713/340; 345/440; 715/700
See application file for complete search history.

(56) References Cited

U.S. PATENT DOCUMENTS 5,961,604 A * 10/1999 Anderson et al. ........... 709/229
2003/0009705 A1 * 1/2003 Thelander et al. ........... 713/340
2003/0033550 A1 * 2/2003 Kuiawa et al. .............. 713/340
2003/0132949 A1 * 7/2003 Fallon et al. ................ 345/700
2004/0004617 A1 * 1/2004 Street et al. ................. 345/440

* cited by examiner

*Primary Examiner*—Thuan Du
(74) *Attorney, Agent, or Firm*—Townsend and Townsend and Crew LLP (57) ABSTRACT

A computer program product residing on a computer-readable medium includes computer-readable instructions for causing a computer to obtain power event data associated with at least one uninterruptible power supply, the power event data including indicia of power events and occurrence times of the corresponding power events, aggregate the power event data in accordance with the occurrence times of the power events, and graphically display the aggregated power event data on a display such that indications of power events that occur close in time are graphically displayed in association with each other.

23 Claims, 8 Drawing Sheets

| Date | Time | Event |
|---|---|---|
| 4/5/04 | 12:38:11 | Self Test Passed |
| 4/5/04 | 12:38:02 | Self Test Initiated |
| 4/5/04 | 12:38:02 | Power Restored |
| 4/5/04 | 12:37:53 | Self Test Passed |
| 4/5/04 | 12:37:52 | Power Failed |
| 4/5/04 | 12:37:35 | Self Test Initiated |
| 4/5/04 | 12:37:08 | Power Restored |
| 4/5/04 | 12:36:59 | Power Failed |
| 4/5/04 | 12:36:42 | Power Restored |
| 4/5/04 | 12:36:33 | Power Failed |
| 4/5/04 | 11:06:51 | Environmental Monitor Communication Established |
| 4/5/04 | 11:06:38 | Communication Established |
| 4/5/04 | 11:06:28 | Monitoring Started |
| 4/5/04 | 11:01:45 | Power Restored |
| 4/5/04 | 11:01:35 | Shutdown process started |
| 4/5/04 | 11:00:33 | Power Failed |
| 4/5/04 | 10:59:08 | Humidity In Range On Probe 2 |
| 4/5/04 | 10:58:54 | Environmental Monitor Communication Established |
| 4/5/04 | 10:58:54 | Humidity Out Of Range On Probe 2 |
| 4/5/04 | 10:58:42 | Communication Established |
| 4/5/04 | 10:58:38 | Communication Lost |
| 4/5/04 | 10:41:33 | Bypass Ended |
| 4/5/04 | 10:40:56 | UPS In Bypass Due To Internal Fault |
| 4/5/04 | 10:40:36 | Communication Established |
| 4/5/04 | 10:40:34 | Communication Lost |
| 4/5/04 | 10:38:44 | Communication Established |
| 4/5/04 | 10:38:41 | Monitoring Started |
| 4/5/04 | 10:36:00 | Communication Established |
| 4/5/04 | 10:35:59 | Environmental Monitor Communication Lost |
| 4/5/04 | 10:24:20 | Communication Lost |
| 4/5/04 | 10:10:53 | Humidity Out Of Range On Probe 2 |
| 4/5/04 | 10:10:41 | Communication Established |
| 4/5/04 | 10:10:32 | Monitoring Started |

POWER EVENT ANALYSIS

BACKGROUND OF THE INVENTION

Today's companies and persons rely on having power more than ever before. Without power, companies may be unable to manufacture goods, or to operate at all, such as if the company is in the business of supplying information over the Internet. Without power, businesses and individuals may be completely incapacitated regarding critical activities, such as making goods, providing services, and transacting personal finances (e.g., filing tax returns, and paying bills).

With such a heavy reliance on power, individuals and companies frequently need to be able to have power outages corrected in short order, and/or have backup power supplies so that their affairs and/or businesses are not significantly affected, and/or be notified when power fails. Correcting power outages typically involves calling a local power company to report a power outage and/or troubleshooting a local power supply/conveyance system, e.g., internal to a company or residence, that has gone out. Uninterruptible power supplies (UPSs) are often used to provide backup power in case of a power outage. A UPS provides surge protection and backup battery power for electronic systems. Backup battery power helps prevent loss of data that can occur during a blackout, a brownout (low voltage), or a spike or a surge of electricity through the system. UPSs are commonly used on computing equipment to guard against data being lost due to a power outage before the data are saved. UPSs used with computing equipment also help to guard against a loss in service by providers of information over the Internet, such as by servers, e.g., hosting web pages. UPSs can also help improve availability of network infrastructure in the home during power outages, protect against data loss on personal computers, etc.

Some UPS software packages provide for logging of power events. These packages typically provide a log of power events that have occurred on a particular system along with the time of occurrence. Customers can scroll through the logs to see what events have happened and when they occurred.

SUMMARY OF THE INVENTION

In general, in an aspect, the invention provides a computer program product residing on a computer-readable medium and including computer-readable instructions for causing a computer to obtain power event data associated with at least one uninterruptible power supply, the power event data including indicia of power events and occurrence times of the corresponding power events, aggregate the power event data in accordance with the occurrence times of the power events, and graphically display the aggregated power event data on a display such that indications of power events that occur close in time are graphically displayed in association with each other.

Implementations of the invention may include one or more of the following features. The power event data can be graphically displayed for any of multiple time frames. The power event data can be graphically displayed with a time frame of at least one of weekly, daily, and a selected day of the week. The computer program product further includes instructions for causing the computer to display a day of occurrence and more detailed data regarding at least the time of occurrence of an indicated power event in response to selection of the indication of the power event. The more detailed data further include a device with which the power event is associated. The power event data are indicative of at least one of frequent overvoltage, frequent undervoltage, extended overvoltage, extended undervoltage, low battery, and power failure associated with the at least one uninterruptible power supply. The power event data are graphically displayed as a bar graph, with portions of bars associated with different power events being displayed visually differently, and with power events occurring close in time to each other having their associated bars stacked on top of each other. The aggregated power event data are graphically displayed to indicate number of occurrences of power events at associated times.

In general, in another aspect, the invention provides a method of providing power event data associated with at least one uninterruptible power supply, the method including obtaining power event data associated with the at least one uninterruptible power supply, the power event data including indicia of power events and occurrence times of the corresponding power events, aggregating the power event data in accordance with the occurrence times of the power events, and graphically displaying the aggregated power event data on a display such that indications of power events that occur close in time are graphically displayed in association with each other.

Implementations of the invention may include one or more of the following features. The power event data are aggregated and displayed according to a selected time frame. The power event data are aggregated and displayed according to multiple similar ones of the selected time frame. The selected time frame is one of a week and a day. The method further includes displaying a day of occurrence and more detailed data regarding at least the time of occurrence of an indicated power event in response to selection of the indication of the power event. The more detailed data further include a device with which the power event is associated. The power event data are indicative of at least one of frequent overvoltage, frequent undervoltage, extended overvoltage, extended undervoltage, low battery, and power failure associated with the at least one uninterruptible power supply. The aggregated power event data are graphically displayed to indicate number of occurrences of power events at associated times.

In general, in another aspect, the invention provides a computer program product residing on a computer-readable medium and including computer-readable instructions for causing a computer to obtain power event data associated with at least one uninterruptible power supply, the power event data including indicia of power events and occurrence times of the corresponding power events, aggregate the power event data in accordance with the occurrence times of the power events, and graphically display the aggregated power event data on a display such that power events occurring close in time are graphically displayed in association with each other, where the instructions are configured to cause the computer to aggregate and display the power event data according to multiple ones of a similar time frame, and where the instructions are configured to cause the computer to graphically display the power event data associated with power events occurring close in time to each other relative to the time frame in association with each other.

Implementations of the invention may include one or more of the following features. The instructions include instructions for causing the computer to aggregate and display the power event data for at least one of different weeks and different days. The power event data are graphically displayed as a bar graph, with portions of bars associated with different power events being displayed visually differently, and with power events occurring close in time to each other relative to the time frame having their associated bars stacked on top of each other. The computer program product further includes instructions for causing the computer to display more detailed data regarding at least the time of occurrence of at least one power event. The aggregated power event data are graphically displayed to indicate number of occurrences of power events at associated times.

Various aspects of the invention may provide one or more of the following capabilities. Power event trends can be identified and remedied if appropriate. Power event trends can be identified without parsing through events in an event log. Causes of power events can be more easily determined, especially regularly-occurring power events. Customers can graphically see trends in power problems without having to manually analyze an event log.

These and other capabilities of the invention, along with the invention itself, will be more fully understood after a review of the following figures, detailed description, and claims.

DETAILED DESCRIPTION OF PREFERRED EMBODIMENTS

Embodiments of the invention can provide techniques for performing power event trending analyses. For example, uninterruptible power supply (UPS) software is provided that aggregates and graphically displays power event log data. The data may be displayed with various time frames, such as daily, hourly, etc. A user can view the displayed data and analyze the data to spot trends. For example, the data may be displayed by hour and day of the week. Thus, a power event repeatedly occurring at the same time (e.g., 10 AM) the same day (e.g., Monday) may be easily identified by the user. The user may then initiate diagnostic procedures to identify a root cause of the power event, e.g., a routine event such as a periodic generator test or other building maintenance activity that affects power quality. Other embodiments are within the scope of the invention.

Figure 1:
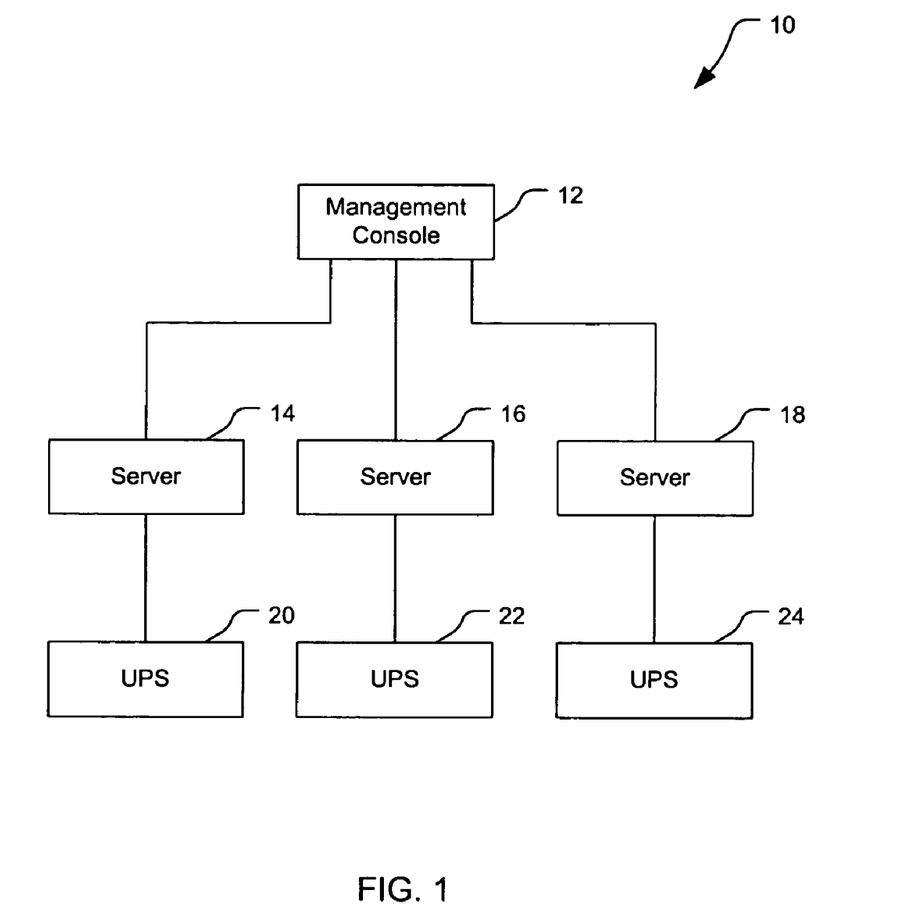
FIG. 1 is a simplified diagram of a telecommunications system including servers connected to uninterruptible power supplies for providing backup power.

Referring to FIG. 1, a telecommunications system 10 includes a management console 12, three servers 14, 16, 18, and three UPSs 20, 22, 24. While three servers 14, 16, 18 and three UPSs 20, 22, 24 are shown, other quantities of servers and UPSs may be used. Further, there may not be a one-to-one relationship between servers and UPSs; for example, one UPS may be connected to and provide backup power for multiple servers. Additionally, the UPSs 20, 22, 24 may provide backup power to devices other than servers. The system 10 shown is an exemplary system, and not limiting of the invention. The system 10 is a typical arrangement for a business configuration using American Power Conversion Corporation (APCC) UPSs and APCC's PowerChute® Business Edition UPS software.

Figure 2:
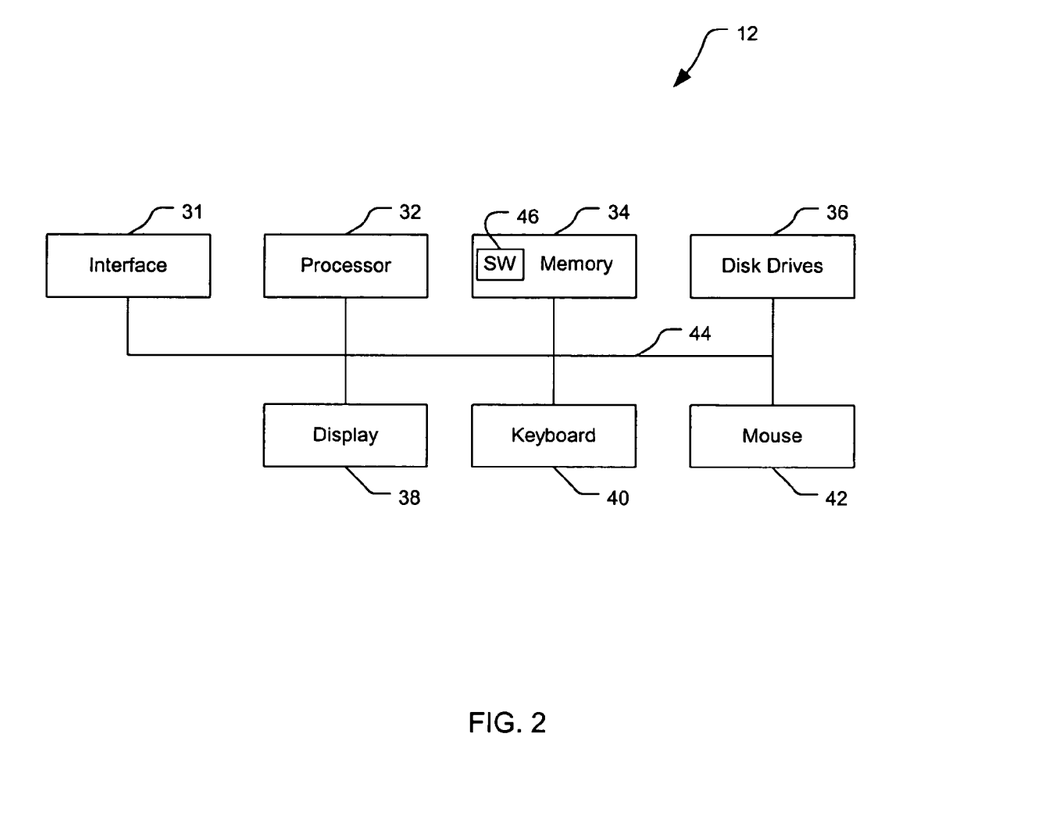
FIG. 2 is a simplified block diagram of a management console of the system shown in FIG. 1.

Referring to FIG. 2, the management console 12 is a computer that includes an interface 31, a processor 32, memory 34, disk drives 36, a display 38, a keyboard 40, and a mouse 42. The console 12 is configured to communicate with the servers 14, 16, 18, and the UPS 20, 22, 24 (FIG. 1) through the interface 31. The processor 32 can be a personal computer central processing unit (CPU) such as a Pentium® IV processor made by Intel® Corporation. Memory 34 includes random access memory (RAM) and read-only memory (ROM). The disk drives 36 include a hard-disk drive and can include floppy-disk drives, a CD-ROM drive, and/or a zip drive. The display 38 is a cathode-ray tube (CRT), although other forms of displays are acceptable, e.g., liquid-crystal displays (LCD) including TFT displays. The keyboard 40 and mouse 42 provide data input mechanisms for a user (not shown). The components 32, 34, 36, 38, 40, and 42 are connected by a bus 44. The computer 12 can store, e.g., in memory 34, computer-readable, computer-executable, software code 46 containing instructions for controlling the processor 32 to perform functions described below (although the description sometimes reads that the software 46 performs the function(s)). The functions implement a UPS management and analysis system. The software 46 can be loaded onto the console 12 by being downloaded via a network connection, uploaded from a disk, etc.

Figure 3:
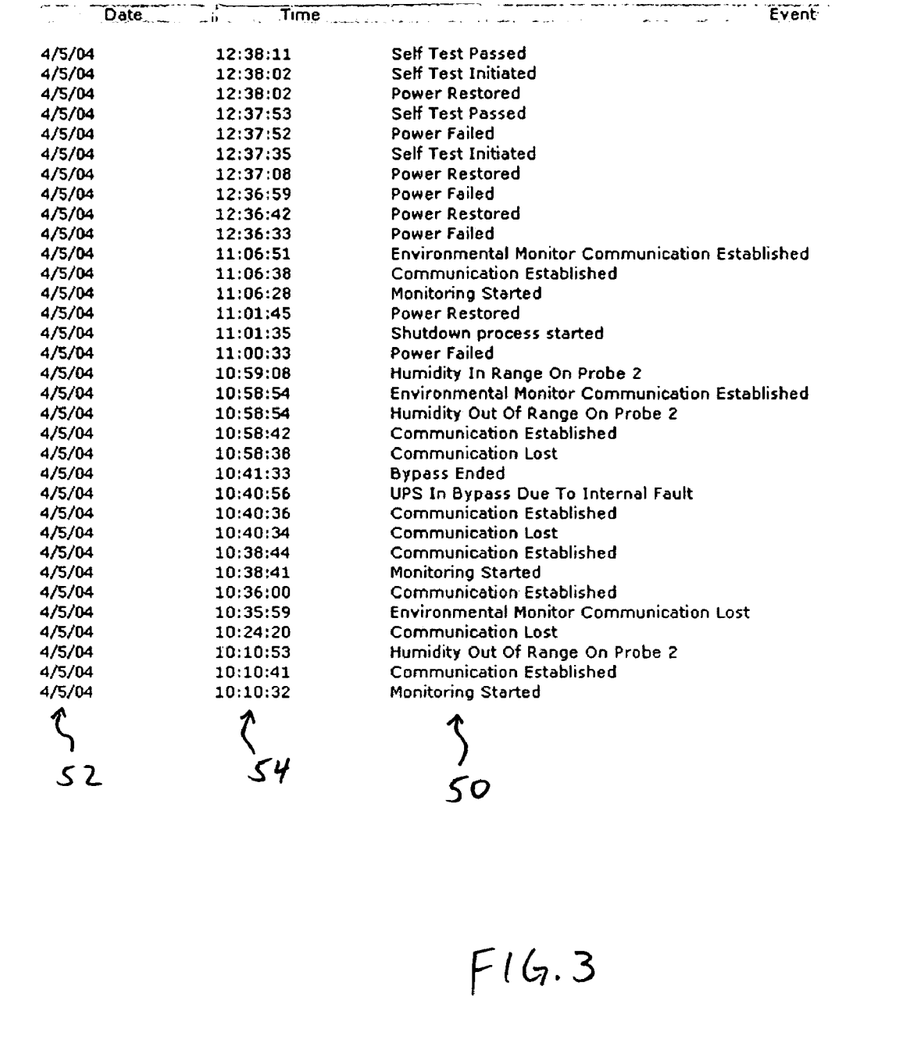
FIG. 3 is an exemplary power event log stored in the management console.

Referring also to FIG. 1, the UPS software 46 stored in the memory 34 is configured to accumulate data related to power events. The console 12 is configured to communicate through the interface 31 to monitor and collect data from the UPSs 20, 22, 24 related to power events. The software 46 tracks and stores in the memory 34 power event data in a power event log. For example, referring to FIG. 3, the software 46 can record a wide variety of power events 50 in an event log 48. As shown, the software 46 records the power event 50 and the associated day 52 and time of day 54.

The software 46 is further configured to cause the processor 32 to produce graphical displays of the historical power event data on the display 38. The data graphically displayed preferably includes data regarding frequent overvoltage, frequent undervoltage, extended overvoltage, extended undervoltage, low battery, and power failed. Preferably, the time of each event is stored in association with data regarding the event. Frequent overvoltage and undervoltage are events indicating that the voltage provided by the corresponding UPS 20, 22, 24 has been over or under, respectively, threshold voltage levels more than a threshold number of times within a designated time frame (e.g., 5 times in 24 hours or 15 times in 1 week (if either of these thresholds is true)). With an undervoltage, the voltage drops low enough that the UPS 20, 22, 24 regulates the voltage to normalize the voltage to a more operable voltage. The undervoltage voltage level is a function of the UPS 20, 22, 24, with the UPS 20, 22, 24 not fully transferring to battery power but transferring partially to boost the voltage. If the voltage goes low enough to transfer to battery power (e.g., ±12 Volts from the norm) then an "On Battery" event is generated as opposed to over/undervoltage. The threshold number of times and the designated time frame may be different for frequent overvoltage and frequent undervoltage. Extended overvoltage and undervoltage refer to the voltage supplied by the UPS 20, 22, 24 being over or under, respectively, threshold voltage levels constantly for longer than designated time frames (e.g., for more than 1 hour). The designated time frames may be different for extended overvoltage and extended undervoltage. The low battery event indicates that the power available from the UPSs battery is below a determined minimum desired amount and the power failed event indicates a loss of power to the UPS 20, 22, 24.

Figure 4:
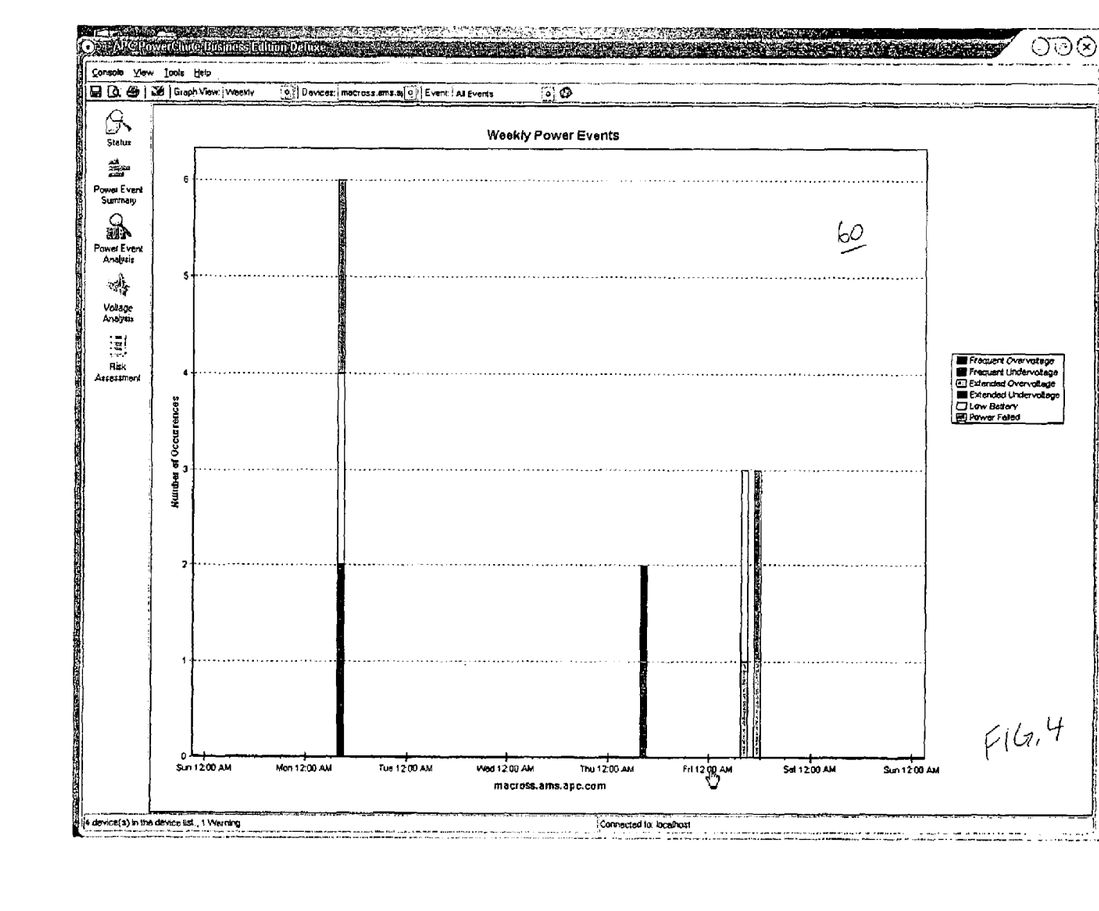
FIGS. 4-7 are exemplary screen shots of graphical representations of power event data.
Figure 5:
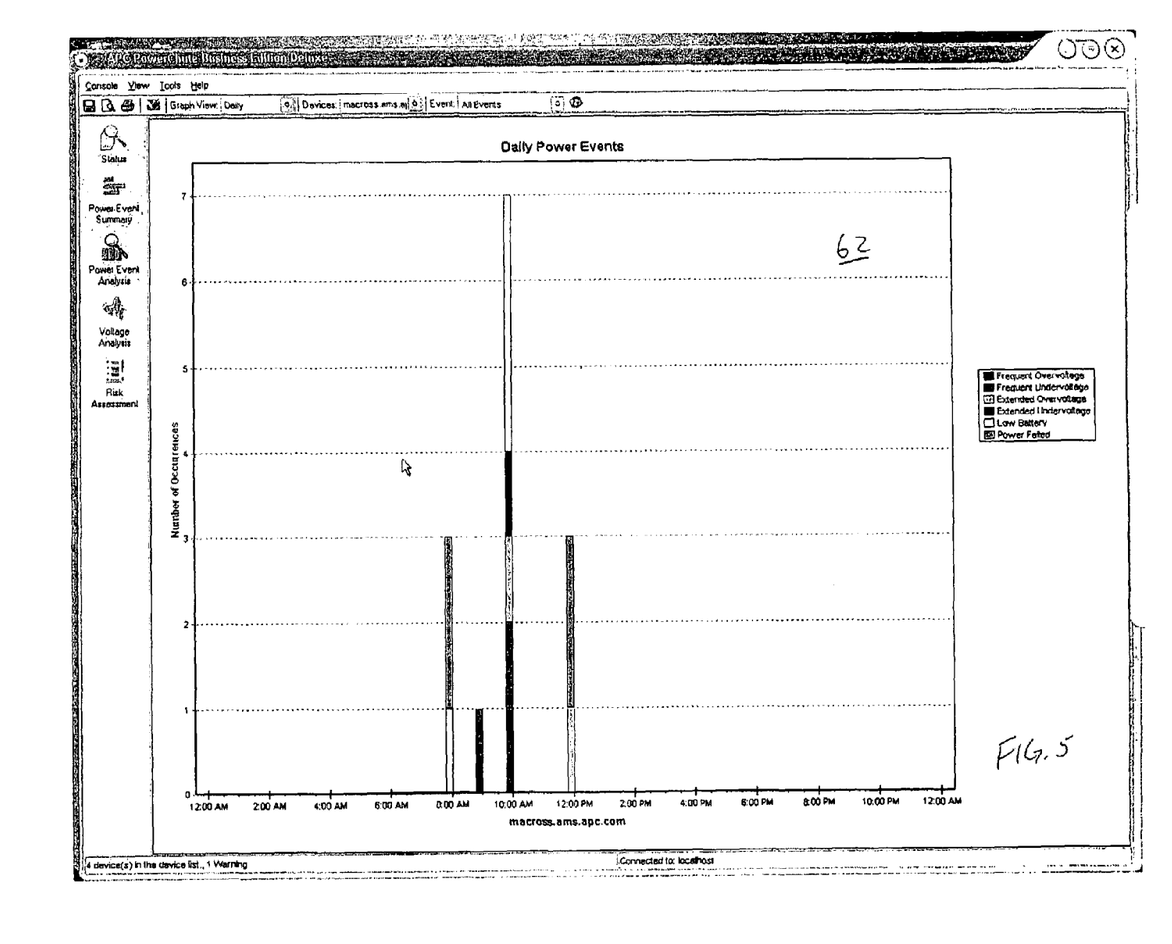
Figure 6:
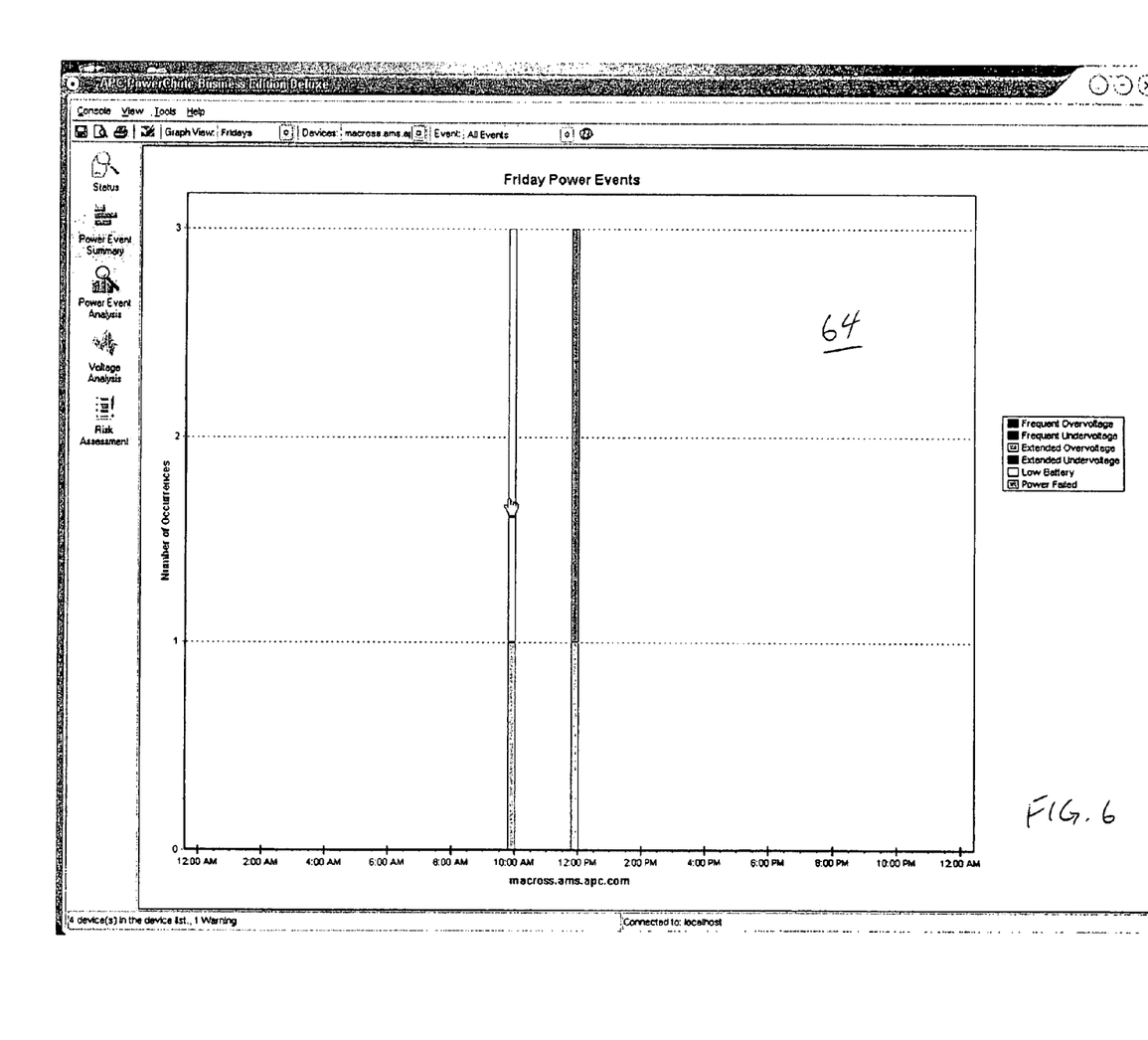

Referring to FIGS. 4-6, the software 46 can produce a variety of graphical displays of the power event data to assist with trend analyses. The graphs shown in FIGS. 4-6 provide aggregations of data that show multiple power events at or near the same time (here, as stacked bars). Whether events are displayed as occurring at the "same" time (e.g., stacked bars) may vary depending upon the graph chosen, e.g., with events occurring further apart being shown as "simultaneous" if the resolution of the graph is more coarse (e.g., a weekly graph versus a daily graph). Further, different mechanisms, e.g., side-by-side bars, etc., may be used to indicate "simultaneous" events.

As shown in FIG. 4, a seven-day graph 60 of cumulative power events since the software 46 began accumulating data, arranged according to when in the course of a calendar week they occurred. Different events are indicated by different shades of portions of bar graphs (although other indicia of power events such as different colors, different patterns, different colors and patterns, etc. and/or other forms of graphs may be used). As shown, trends readily appear as multiple power events occurred simultaneously or nearly so. The graph 60 quickly reveals this fact to an observer.

As shown in FIG. 5, a 24-hour graph 62 of power events over the course of a day is displayed to assist with an analysis of potential power problems. Again, power events are shown as differently-shaded bars. The data reflected in the graph 62 may be all data since the software 46 began accumulating data, or may be for a selected time frame. The graph 62 suggests to an observer to analyze the system 10 or outside influences on the system 10 that affected power at or near 10 AM each day.

As shown in FIG. 6, a 24-hour graph 64 of power events on a selected day of the week, here each Friday. Any day of the week may be selected by the user. The graph 64 plots the accumulated power events for every Friday since the software 46 began accumulating data, and shows these events as a function of time of day. Other time frames for which data are displayed may be used. For example, the user may select a desired time frame such as several consecutive weeks, several weeks where at least one week is not consecutive with any of the other selected weeks, a month, multiple months, etc. The graph 64 can help identify a trend of power events recurring systematically on the same day of the week at or near the same time, or in a recurring order even if not at the same time.

Figure 7:
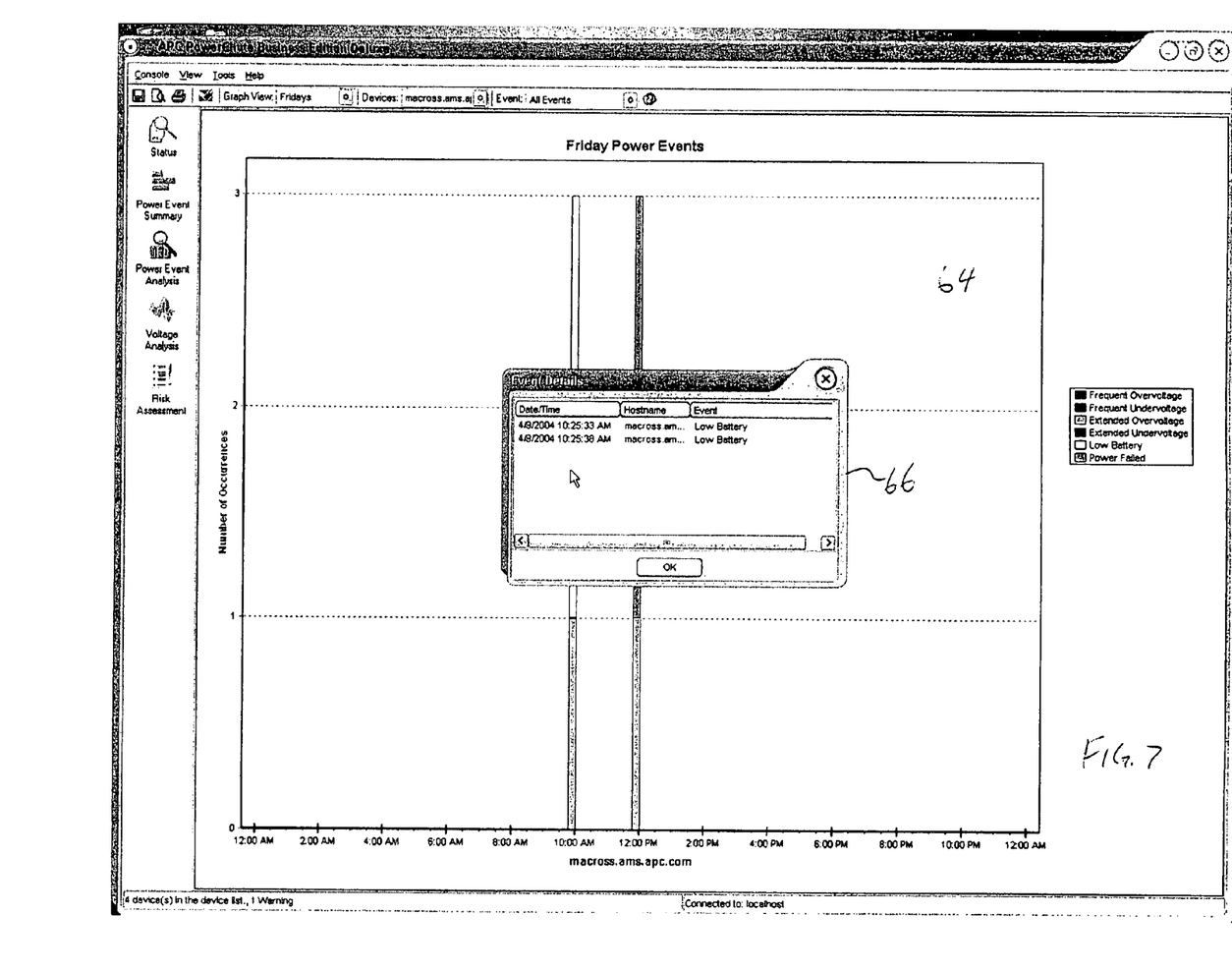

The graphs shown in FIGS. 4-6 are exemplary only, and not the only graphs that can be used in accordance with the invention. As discussed, different ways of identifying power events may be used. Also, the graphs 60, 62, 64 may span different time periods than those shown. Further, the graphs 60, 62, 64 may be altered or supplemented. For example, referring to FIG. 7, a window 66 may be overlaid on top of the graph 64 (or other graphs) in response to selection of more detail by the user. The selection may involve, e.g., clicking on an icon, clicking on or passing the mouse cursor over a bar associated with a power event, etc. Here, the window 66 provides more detail regarding the power events near 10 AM, indicating the exact time (within the resolution of the time of the power entries recorded by the software 46) and hostname associated with the power event. This may further enhance the user's ability to analyze trends in power problems. As shown, power events that do not occur at exactly the same time may be grouped for purposes of the display. Thus, events that occur close in time may be displayed in a group, with further detail regarding the times of their occurrences preferably being available, at least upon request. Further, fewer than all of the power events may be displayed in a graph, including having only one power event type being displayed.

Figure 8:
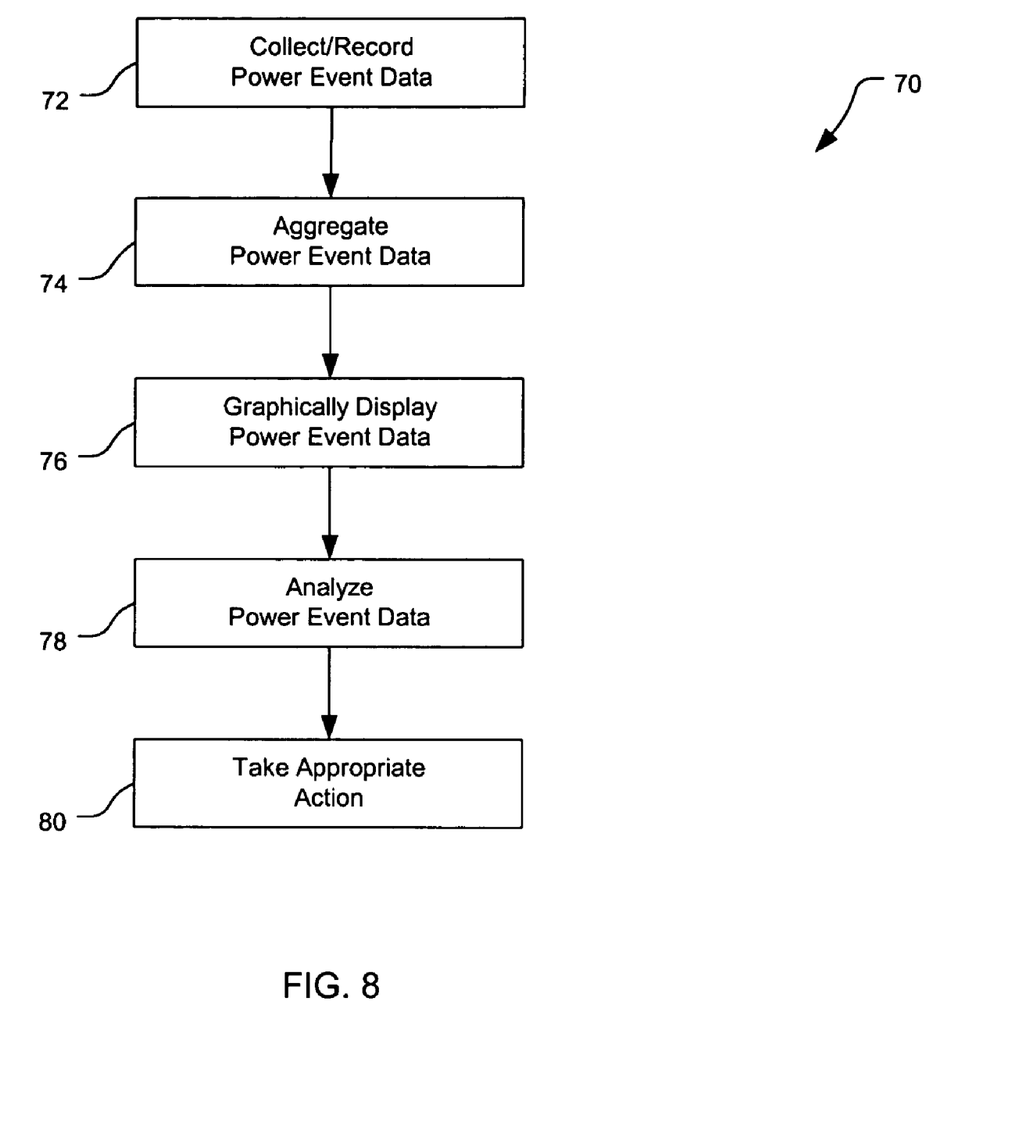
FIG. 8 is a block flow diagram of a process of obtaining, aggregating, displaying, and evaluating power event data.

In operation, referring to FIG. 8, with further reference to FIGS. 1-7, a process 70 for monitoring, recording, displaying, and analyzing power event data using the system 10 includes the stages shown. The process 70, however, is exemplary only and not limiting. The process 70 may be altered, e.g., by having stages added, removed, or rearranged.

At stage 72, power event data are collected and recorded. The management console 12 requests information from the UPSs 20, 22, 24 regarding power events. The UPSs 20, 22, 24 provide power event data that the management console receives through the interface 31. The received power event data are stored in the memory 34.

At stage 74, the processor 32 executes the software 46 to aggregate the power event data. These data may be aggregated as they are received, after they are received and before a data display is requested, after they are received and in response to a data display request, or at another time. If they are aggregated in response to a data display request, e.g., a selection made by the user, e.g., using the mouse 42 of the management console 12, then the software 46 causes the aggregation in accordance with the format of the display requested. For example, if a weekly graph is chosen such as the graph 60, then data are aggregated for the selected weeks, e.g., the two most recent seven-day periods, or the two most recent calendar weeks, all weeks since inception of use of the software 46, or other blocks of seven days.

At stage 76, the aggregated power event data are displayed. The software 46 causes the processor 32 to send the aggregated data to the display 38 for display in the desired format, e.g., weekly, daily, etc. The data are displayed in a bar graph or other form of graph that preferably facilitates trend analysis.

At stage 78, the user analyzes the displayed data for power event trends. For example, if the user analyzes the graph 60, the user may determine that there is a trend of power events occurring on Monday afternoons at about the same time, and power events occurring near the same time Friday afternoons.

At stage 80, the user takes appropriate action depending on the analysis of stage 78. For example, the user may determine that on Monday afternoons, a weekly test is run that affects the power and thus recurring power events at this time do not warrant corrective action. The user, however, may determine that the test should be altered to not cause a power event. Alternatively still, the user may determine that while a periodic test is run each Monday afternoon, because the same power event does not occur each time, that further analysis is warranted to determine what affect the test is having and why different power events are induced. Still further actions may be taken or initiated by the user.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer program product residing on a computer-readable medium and comprising computer-readable instructions for causing a computer to:
   obtain power event data associated with at least one uninterruptible power supply, the power event data including indicia of power events and occurrence times of the corresponding power events;
   aggregate the power event data in accordance with occurrence times of the power events; and
   graphically display the aggregated power event data within a first time frame on a display such that indications of power events, of different power event types, that occur within a second time frame that is substantially less than the first time frame, are graphically displayed to indicate the types and total number of events that occur within the second time frame.

2. The computer program product of claim 1 wherein the power event data can be graphically displayed for any of multiple first time frames.

3. The computer program product of claim 2 wherein the first time frame is selected from a week and a day.

4. The computer program product of claim 1 further comprising instructions for causing the computer to display a day of occurrence and more detailed data regarding at least the time of occurrence of an indicated power event in response to selection of the indication of the power event.

5. The computer program product of claim 4 wherein the more detailed data further include a device with which the power event is associated.

6. The computer program product of claim 1 wherein the power event data are indicative of at least one of frequent overvoltage, frequent undervoltage, extended overvoltage, extended undervoltage, low battery, and power failure associated with the at least one uninterruptible power supply.

7. The computer program product of claim 1 wherein the power event data are graphically displayed as a bar graph, with portions of bars associated with different power events being displayed visually differently, and with power events occurring within the second time frame having their associated bars stacked on top of each other.

8. The computer program product of claim 1 wherein the aggregated power event data are graphically displayed to indicate number of occurrences of power events at associated times.

9. The computer program product of claim 1 wherein the second time frame is dependent on the first time frame.

10. A method of providing power event data associated with at least one uninterruptible power supply, the method comprising:
    obtaining power event data associated with the at least one uninterruptible power supply, the power event data including indicia of power events and occurrence times of the corresponding power events;
    aggregating the power event data in accordance with occurrence times of the power events; and
    graphically displaying the aggregated power event data within a first time frame on a display such that indications of power events, of different power event types, that occur within a second time frame that is substantially less than the first time frame, are graphically displayed to indicate the types and total number of events within the second time frame.

11. The method of claim 10 wherein the first time frame is selectable.

12. The method of claim 11 wherein the power event data are aggregated and displayed according to multiple similar ones of the first time frame.

13. The method of claim 12 wherein the first time frame is one of a week and a day.

14. The method of claim 10 further comprising displaying a day of occurrence and more detailed data regarding at least the time of occurrence of an indicated power event in response to selection of the indication of the power event.

15. The method of claim 14 wherein the more detailed data further include a device with which the power event is associated.

16. The method of claim 10 wherein the power event data are indicative of at least one of frequent overvoltage, frequent undervoltage, extended overvoltage, extended undervoltage, low battery, and power failure associated with the at least one uninterruptible power supply.

17. The method of claim 10 wherein the aggregated power event data are graphically displayed to indicate number of occurrences of power events at associated times.

18. A computer program product residing on a computer-readable medium and comprising computer-readable instructions for causing a computer to:
    obtain power event data associated with at least one uninterruptible power supply, the power event data including indicia of power events and occurrence times of the corresponding power events;
    aggregate the power event data over a first time frame in accordance with the occurrence times of the power events; and
    graphically display the aggregated power event data within a first time frame on a display such that indications of power events, of different power event types, that occur within a second time frame that is substantially less than the first time frame, are graphically displayed to indicate the types and total number of events within the second time frame.

19. The computer program product of claim 18 wherein the instructions include instructions for causing the computer to aggregate and display the power event data for at least one of different weeks and different days.

20. The computer program product of claim 18 wherein the power event data are graphically displayed as a bar graph, with portions of bars associated with different power events being displayed visually differently, and with power events occurring within the second time frame having their associated bars stacked on top of each other.

21. The computer program product of claim 18 further comprising instructions for causing the computer to display more detailed data regarding at least the time of occurrence of at least one power event.

22. The computer program product of claim 18 wherein the aggregated power event data are graphically displayed to indicate number of occurrences of power events at associated times.

23. The computer program product of claim 18 wherein the second time frame is a function of the first time frame.

* * * * *